Patented Feb. 13, 1940

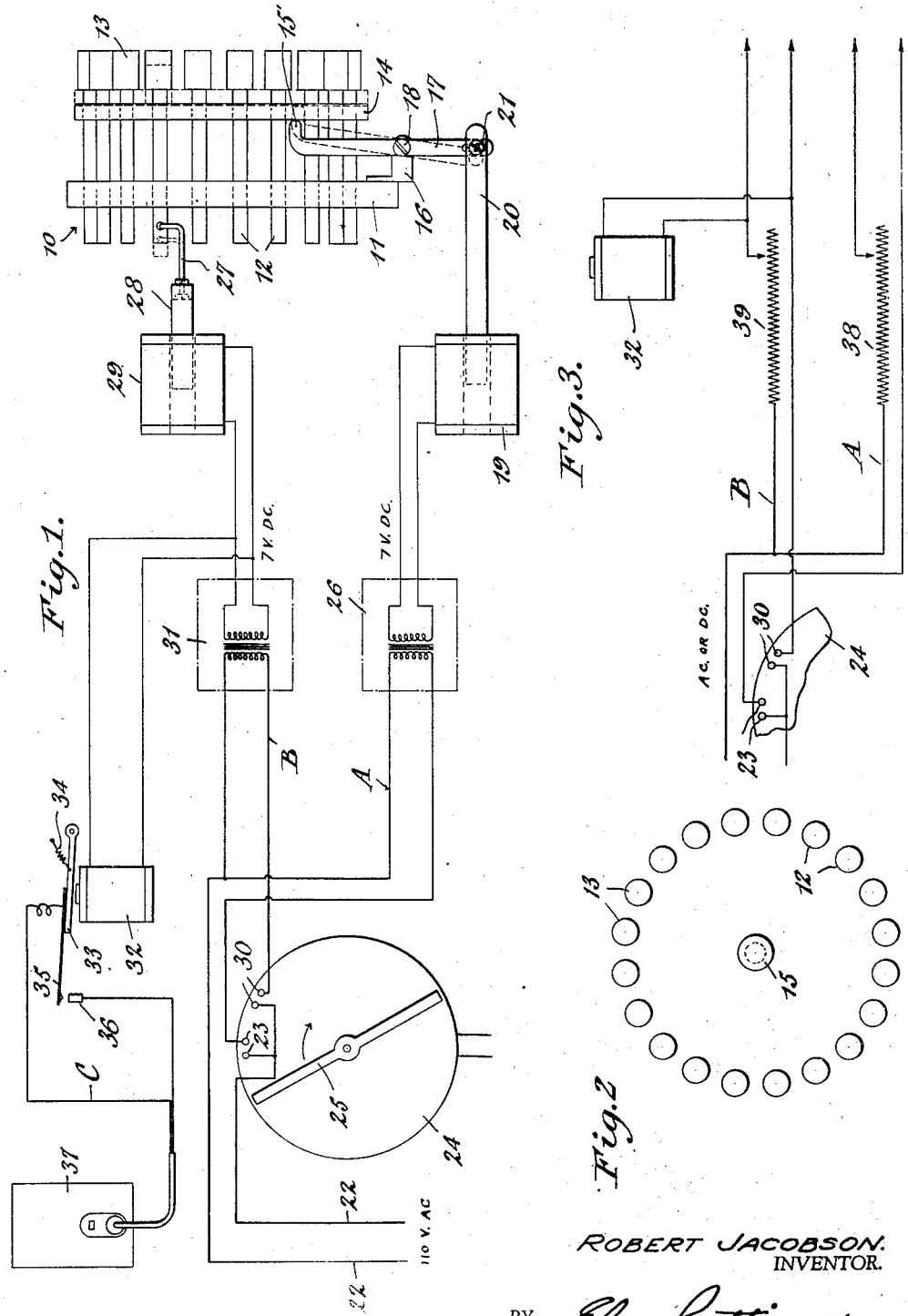

2,190,026

UNITED STATES PATENT OFFICE 2,190,026

TIME CONTROLLED MECHANISM FOR COIN CONTROLLED AUTOMATIC PHONOGRAPHS

Robert Jacobson, New York, N. Y.

Application December 14, 1937, Serial No. 179,660

2 Claims. (Cl. 161—5)

This invention relates to improvements in coin controlled automatic phonographs and more particularly to a time controlled mechanism for automatically selecting at set intervals, a predetermined phonograph record to be played, and for starting the operation of the phonograph.

Coin controlled automatic phonograph machines which are installed for use in restaurants, taverns and other like public gathering places for the entertainment of the patrons who patronize such establishments are dependent for operation by patrons placing coins into the machine. By such act the patrons may through manual actuation of a record selecting mechanism, set the machine to play any one of a predetermined number of phonograph records. The main purpose of the invention is to embody in a phonograph machine of the above type, a time controlled mechanism which will automatically select a predetermined phonograph record and start the machine in operation at set time intervals, whereby a "free record" is played at the expense of the proprietor of the establishment for the enjoyment and entertainment of the patrons present.

Another feature of the invention resides in a time controlled mechanism for coin controlled automatic phonographs wherein any previously set record selector element or elements are automatically moved to neutral or cancelling position, and after which a predetermined selector element is moved to record selecting position and the automatic phonograph set in operation for the playing of a "free" record.

Another feature of the invention is the provision of a time controlled mechanism which may be installed upon the coin controlled automatic phonograph machine now in use without requiring changing the construction of such machines.

Other features of the invention will appear as the following specification is read in conjunction with the accompanying drawing, in which:

Figure 1 is a diagrammatic view of the invention.

Figure 2 is a detail front elevational view of the record selector unit.

Figure 3 is a fragmentary diagrammatic view showing the use of a variable resistance in the electric circuits in lieu of a transformer.

Referring to the drawing by reference characters, the numeral 10 designates the record selector unit of a coin controlled automatic phonograph machine of the type shown in U. S. Letters Patent No. 2,002,236. The record selector unit 10 is shown diagrammatically and includes a fixed supporting bearing 11 in which a circular series of record selector push pins or plungers 12 are slidably mounted. The outer ends of the plungers 12 are provided with button heads 13 and the heads may contain identification numbers or may be associated with numbers upon a dial plate. There is one phonograph record in the machine for each selector plunger, and the selection of the records is controlled by the manual pushing in of the selected plunger or plungers. There is also provided on the automatic phonograph machine a list of the titles and selections of the records identified by the corresponding members associated with the push buttons, but these details are well known and are not essential to the operation of the invention presently to be described.

The selector unit 10 also includes a record cancelling ring 14 which surrounds the series of selector plungers 12 and which is normally disposed rearward of the button heads 13. In practice, the cancelling ring 14 is operatively connected to the cancelling push plunger 15 arranged centrally of the series of plungers 12, so that upon inward pushing of the cancelling plunger 15, the cancelling ring 14 will move forward and return all pushed in plungers 12 to their neutral outer position prior to the manual actuation of a selected plunger 12 to be pushed in record selecting position. In my invention about to be described, I automatically actuate the cancelling ring 14 to cancelling position preparatory to the automatic actuation of a predetermined selector plunger 12 to record selecting position and the simultaneous starting of the phonograph machine in operation.

Attached to the support 11 and extending forwardly thereof is a bracket 16 to which the intermediate position of a rock lever 17 is pivotally connected as at 18. The rock lever 17 is independently operable with respect to the usual manually operated means of the selector unit. One end of the lever 17 terminates in a forwardly extending post 15' which extends inwardly of the unit 10 and has bearing engagement with the rear side of the cancelling ring 14. The lever 17 is actuated by a solenoid 19 to move the cancelling ring 14 to cancelling position as shown in dotted lines in Figure 1. The outer end of the lever 17 is connected to the outer end of the sliding core armature 20 of the solenoid 19 by a pin and slot connection 21. The solenoid 19 is arranged in an electric circuit A which includes the electric power wires 22—22 of a 110 v., A. C. or D. C. power supply system. The circuit A is normally open by reason of the spaced contact terminals 23—23 which are embodied in an electric time clock 24 of any conventional construction. The time clock 24 includes a rotatable circuit closure 25 which is set to operate a half revolution on each actuation thereof to momentarily bridge the contact terminals 23—23. It will be understood that the electric time clock 24 may be set to operate the circuit closure 25 at various time intervals, such as every half hour. Arranged within the circuit A between the contacts 23 and the solenoid 19 is a transformer 26 which may be of the type known under the name "Electropak" to change the 110 v. A. C. current to 7 v., D. C. which is sufficient to energize the solenoid to effect actuation of the lever 17.

Connected to one of the record selector plungers 12 is the outer end of an extension arm 27 carried by the outer end of the core armature 28 of a solenoid 29. The selector plunger 12 to which the solenoid is connected is that which controls the selective playing of a "free record", for upon energization of the solenoid, the said plunger is pulled inwardly to record selecting position as shown in dotted lines in Figure 1. The solenoid 29 is arranged in an electric circuit B which also receives its source of current from the 110 v., A. C. power wires 22—22. The circuit B is normally open by reason of the spaced contacts 30—30 which are arranged in the time control clock 24 just beyond the contacts 23—23, so that after a brief time interval after passing over the contacts 23—23, the rotatable circuit closure 25 will bridge the contacts 30—30 and momentarily close the circuit B. The circuits A and B are successively closed to effect a successive energization of the solenoids 19 and 29 respectively with a brief lapse of time therebetween. The circuit B is provided with a transformer 31 similar to the transformer 26 in the circuit A and which is arranged between the spaced contacts 30—30 and the solenoid 29.

Also arranged in the circuit B and receiving its energy from the low voltage section of the circuit is an electro magnet 32 which when energized, operates a pivoted armature 33 which is normally held out of engagement with the magnet by a spring 34. Carried by and insulated from the armature 33 and extending therefrom is a contact arm 35 normally disposed out of engagement with a contact 36. The contacts 35 and 36 are arranged in the starting circuit C of the automatic phonograph machine. The circuit C is operatively connected to the coin trip device 37, which device is employed for automatically starting the automatic phonograph upon the depositing of the proper denomination of coin therein after having first manually actuated the cancelling push plunger 15 and the record selecting push plunger or plungers 12. Instead of the coin operating the device 37 to start the machine, the energizing of the circuit C performs such operation.

With further reference to the operation of the circuit B, it will be seen that when the circuit B is closed, the electro-magnet 32 will be energized, causing the armature 33 to be drawn down and causing the contact arm 35 to engage the contact 36 and thereby close the circuit C. To operate the coin trip device 37, it is only necessary that the circuit C be momentarily closed. The circuit C receives its electrical energy from the electrical source from which the coin trip device is operated.

In operation of the invention, the electric time clock 24 is predeterminedly set to operate the circuit closer 25 at certain intervals such as every half hour, and as the circuit closer makes a half revolution it first bridges the spaced contacts 23—23 to close the circuit A, thus energizing the solenoid 19 and actuating the rock lever 17, which in turn actuates the cancelling ring 14 to move any previously pushed-in record selector plungers 12 to neutral position. After a lapse of a few seconds, the circuit closer bridges the contacts 30—30 which closes the circuits B and C. The closing of the circuit B energizes the solenoid 29 and actuates that plunger 12 to record selecting position and which controls the selection of the "free record". At the same time, the electro magnet 32 is energized which causes the armature 33 to be drawn down which effects the engagement of the contact 35 with the contact 36 to close the phonograph starting circuit C. The machine may now be said to be in record playing operation, and will remain so until such time as the playing of the record has been completed, whereupon the automatic stop associated with coin controlled automatic phonographs functions to render the same inoperative.

From the foregoing description it will be seen that by reason of the time controlled mechanism, a coin controlled automatic phonograph may be made to automatically play a record at predetermined intervals of time, depending upon the setting of the clock to function as a circuit closing device. Upon each actuation of the circuit closer 25, the patrons of an establishment in which the automatic phonograph is installed are treated to the playing of a "free record."

In Figure 3 of the drawing, I have illustrated a slightly modified form of the invention wherein variable resistances 3 and 39 are substituted respectively for the transformers 26 and 31 respectively in the circuits A and B to reduce either A. C. or D. C. current to the voltage required to actuate the solenoids, and electro magnet.

While I have shown and described what I consider to be the preferred embodiment of my invention, I wish it to be understood that such changes and alterations as come within the appended claims may be resorted to if desired.

Having thus described the invention, what I claim as new and desire to secure by Letters Patent of the United States, is:

1. A time controlled means for periodically playing a particular phonograph record of an automatic coin controlled phonograph comprising in combination, a manually actuated phonograph record selecting mechanism having a plurality of individual push elements adapted to be manually pushed to a set record selecting position, record cancelling mechanism for returning one or more previously set push element or push elements to cancelled non-record selecting position, electrically operated means for actuating the record cancelling mechanism including a normally open record cancelling circuit having a pair of closely spaced electric contact terminals and a source of electric energy, a clock on which said terminals are mounted having a driven rotatable contact clock hand adapted to bridge said contact terminals to momentarily close said record cancelling circuit, electrically actuated means for selectively sliding a predetermined one of said push elements to record selecting position including a normally open record selecting circuit having a source of electric energy and a pair of closely spaced terminal contacts being mounted on said clock adjacent to said first mentioned pair of contact terminals for subsequent engagement by said contact clock hand whereby the circuits are successively closed by said contact clock hand during rotation thereof.

2. A time controlled means for periodically playing a particular phonograph record of an automatic coin controlled phonograph comprising in combination, a manually actuated phonograph record selecting mechanism having a plurality of individual push elements adapted to be manually pushed to a set record selecting position, record cancelling mechanism for returning one or more previously set push element or push elements to cancelled non-record selecting position, electrically operated means for actuating the record cancelling mechanism including a normally open record cancelling circuit having a pair of closely spaced electric contact terminals, and a source of electric energy, a clock on which said terminals are mounted having a driven rotatable contact clock hand adapted to bridge said contact terminals to momentarily close said record cancelling circuit, electrically actuated means for selectively sliding a predetermined one of said push elements to record selecting position including a normally open record selecting circuit having a source of electric energy and a pair of closely spaced terminal contacts, said last mentioned terminal contacts being mounted on said clock adjacent to said first mentioned pair of contact terminals for subsequent engagement by said contact clock hand whereby the circuits are successively closed by said contact clock hand during rotation thereof, a normally open automatic electric phonograph starting circuit, and electrically actuated means connected to and responsive to the closing of the selector circuit for closing said starting circuit.

ROBERT JACOBSON.